United States Patent
Baglin et al.

(10) Patent No.: US 6,331,364 B1
(45) Date of Patent: Dec. 18, 2001

(54) PATTERNED MAGNETIC RECORDING MEDIA CONTAINING CHEMICALLY-ORDERED FEPT OF COPT

(75) Inventors: John Edward Eric Baglin, Morgan Hill; Andrew John Kellock; Bruce David Terris, both of Sunnyvale; Dieter Klaus Weller, San Jose; Liesl Folks, Los Gatos, all of CA (US)

(73) Assignees: International Business Machines Corporation, Armonk, NY (US); University of New Orleans Foundations, New Orleans, LA (US)

( * ) Notice: Subject to any disclaimer, the term of this patent is extended or adjusted under 35 U.S.C. 154(b) by 0 days.

(21) Appl. No.: 09/350,803

(22) Filed: Jul. 9, 1999

(51) Int. Cl.$^7$ .................................. G11B 5/66; G11B 5/70
(52) U.S. Cl. .............................. 428/694 T; 428/694 TS; 428/900
(58) Field of Search .................... 428/900, 65.3, 428/65.7, 694 T, 694 TS, 694 TR

(56) References Cited

U.S. PATENT DOCUMENTS

| | | | |
|---|---|---|---|
| 5,363,794 | 11/1994 | Lairson et al. | 117/7 |
| 5,587,223 | 12/1996 | White | 428/195 |
| 5,603,766 | 2/1997 | Visokay et al. | 117/105 |
| 5,768,075 | 6/1998 | Bar-Gadda | 360/135 |
| 5,820,769 | 10/1998 | Chou | 216/22 |
| 5,989,728 | * 11/1999 | Coffey et al. | 428/611 |
| 6,086,974 | * 7/2000 | Thiele et al. | 428/65.3 |

OTHER PUBLICATIONS

C. Chappert, et al., "Planar Patterned Magnetic Media Obtained by Ion Irradiation", Science (USA) vol. 280, No. 5371, Jun. 19, 1998, pp. 1919–1922.

K. Coffey, et al., "High Anisotropy $L1_0$ Thin Films for Longitudinal Recording", IEEE Transactions on Magnetics, vol. 31, No. 6, Nov. 1995, pp. 2737–2739.

J.K. Bhardwaj, et al., "Advanced Silicon Etching Using High Density Plasmas", SPIE Proceedings, Micromachining and Microfabrication Process technology, vol. 2639, Oct. 23–24, 1995, pp. 224–233.

M. Watanabe, et al., "Microstructure and Magnetic Properties of High–Coercive Fe–Pt Alloy Thin films", Materials Transactions, JUM, vol. 37, No. 3, 1996, pp. 489–493.

\* cited by examiner

*Primary Examiner*—Paul Thibodeau
*Assistant Examiner*—Holly C. Rickman
(74) *Attorney, Agent, or Firm*—Thomas R. Berthold

(57) ABSTRACT

A patterned magnetic recording disk, i.e., a disk with discrete magnetically recordable regions that can function as discrete magnetic bits, is formed by ion irradiating a continuous magnetic film of a chemically-ordered alloy having a tetragonal crystalline structure through a patterned non-contact mask. The ions cause disordering in the film and produce regions in the film that have no magnetocrystalline anisotropy. The regions of the film not impacted by the ions retain their chemical ordering and magnetocrystalline anisotropy and thus serve as the discrete magnetic regions that can be recorded as individual magnetic bits. The chemically-ordered alloy is preferably Co (or Fe) and Pt (or Pd) with the c-axis of the tetragonal crystalline film oriented at an angle less than 45 degrees relative to the plane of the film, so that after patterning the discrete magnetic regions can be recorded by horizontal magnetic recording.

12 Claims, 4 Drawing Sheets

PATTERNED MAGNETIC RECORDING MEDIA CONTAINING CHEMICALLY-ORDERED FEPT OF COPT

STATEMENT OF GOVERNMENT RIGHTS

The Government of the United States of America has rights in this invention pursuant to Contract No. MDA 972-97-1-003 awarded by the Defense Advanced Research Projects Agency.

TECHNICAL FIELD

This invention relates generally to magnetic recording media, and more particularly to patterned horizontal magnetic recording disks with discrete magnetic regions or islands.

BACKGROUND OF THE INVENTION

Conventional magnetic recording disks in hard disk drives typically use a continuous granular magnetic film, such as a sputter-deposited hexagonal-close-packed (HCP) cobalt-platinum (CoPt) alloy, as the recording medium. Each magnetic bit in the medium is comprised of many small magnetized grains.

The challenge of producing continuous granular films as magnetic media will grow with the trend toward higher areal storage densities. Reducing the size of the magnetic bits while maintaining a satisfactory signal-to-noise ratio, for example, requires decreasing the size of the grains. Unfortunately, significantly reducing the size of weakly magnetically coupled magnetic grains will make their magnetization unstable at normal operating temperatures. To postpone the arrival of this fundamental "superparamagnetic" limit and to avert other difficulties associated with extending continuous granular media, there has been renewed interest in patterned magnetic media.

With patterned media, the continuous granular magnetic film that covers the disk substrate is replaced by an array of spatially separated discrete magnetic regions or islands, each of which serves as a single magnetic bit. The primary approach for producing patterned media has been to selectively deposit or remove magnetic material from a magnetic layer on the substrate so that magnetic regions are isolated from one another and surrounded by areas of nonmagnetic material. There are a variety of techniques for the selective deposition or removal of magnetic material from a substrate. In one technique the substrate is covered with a lithographically patterned resist material and a magnetic film is deposited to cover both the areas of resist and the areas of exposed substrate. The resist is dissolved to lift off the magnetic film that covers it, leaving an array of isolated magnetic regions. An alternative technique is to first deposit a magnetic film on the substrate and then pattern resist material on the magnetic film itself. Magnetic material from the areas not protected by the resist can then be selectively removed by well-known processes. Examples of patterned magnetic media made with these types of lithographic processes are described in U.S. Pat. Nos. 5,587,223; 5,768,075 and 5,820,769.

From a manufacturing perspective, an undesirable aspect of the process for patterning media that requires the deposition or removal of material is that it requires potentially disruptive processing with the magnetic media in place. Processes required for the effective removal of resists and for the reliable lift-off of fine metal features over large areas can damage the material left behind and therefore lower production yields. Also, these processes must leave a surface that is clean enough so that the magnetic read/write head supported on the air-bearing slider of the disk drive can fly over the disk surface at very low flying heights, typically below 30 nanometers (nm).

A technique for patterning a special type of perpendicular magnetic recording media by ion irradiation is described by Chappert et al, "Planar patterned magnetic media obtained by ion irradiation", Science, Vol. 280, Jun. 19, 1998, pp. 1919–1922. In this technique Pt-Co-Pt multilayer sandwiches which exhibit perpendicular magnetocrystalline anisotropy are irradiated with ions through a lithographically patterned mask. The ions mix the Co and Pt atoms at the layer interfaces and substantially reduce the perpendicular magnetocrystalline anisotropy of the film.

In contrast to conventional CoPt alloy continuous granular films, chemically-ordered alloys of FePt and CoPt formed as thin films have also been proposed for horizontal magnetic recording media. Chemically-ordered alloys of FePt and CoPt, in their bulk form, are known as tetragonal $L1_0$-ordered phase materials (also called CuAu materials). They are known for their high magnetocrystalline anisotropy and magnetic moment, properties that are also desirable for high-density magnetic recording media. The c-axis of the $L1_0$ phase is similar to the c-axis of HCP CoPt alloys in that both are the easy axis of magnetization. Thus, while the disordered face-centered-cubic (FCC) solid solution of Co and Pt has cubic symmetry and low magnetocrystalline anisotropy, the ordered $L1_0$ phase has uniaxial anisotropy similar to, but greater in magnitude than HCP CoPt alloys.

These chemically-ordered films can be made by several known processes. Films having the $L1_0$ phase of FePt with the c-axis oriented perpendicular to the substrate, and thus suitable for magneto-optical or perpendicular magnetic recording media, have been grown by molecular beam epitaxy, and by alternating the deposition of layers of Fe and Pt, followed by annealing, the latter approach being described in U.S. Pat. No. 5,363,794. In another approach, equiatomic FePt or CoPt is sputter deposited as a continuous film and then subjected to a relatively high-temperature post-deposition annealing to achieve the chemical ordering. This approach results in the c-axis being oriented substantially in the plane of the film, so that the films are suitable for horizontal magnetic recording, and is described by Coffey et al., "High Anisotropy $L1_0$ Thin Films for Longitudinal Recording", IEEE Transactions on Magnetics, Vol. 31, No. 6, November 1995, pp. 2737–2739; and Watanabe et al., "Microstructure and Magnetic Properties of High-Coercive Fe-Pt Alloy Thin Films", Materials Transactions, JIM, Vol. 37, No. 3, 1996, pp. 489–493. In a third approach, as described in IBM's co-pending application Ser. No. 08/920,938 filed Aug. 29, 1997, now U.S. Pat. No. 6,086,974, which is incorporated herein by reference, a continuous granular film with grains of a chemically-ordered FePt or FePtX (or CoPt or CoPtX) alloy in the tetragonal $L1_0$ structure and with the c-axis in the plane for horizontal magnetic recording, is produced by sputtering without annealing. The granular structure and chemical ordering are controlled by sputter parameters and by the use of an etched seed layer that provides a structure for the subsequently sputter-deposited granular magnetic film.

What is needed is a horizontal magnetic recording media that achieves the advantages of both patterned media and the chemically-ordered type of media and that can be manufactured without selectively removing and/or depositing the magnetic material on the substrate.

SUMMARY OF THE INVENTION

The invention is a patterned magnetic recording disk, i.e., a disk with discrete magnetically recordable regions that can function as discrete magnetic bits, and a method for making the disk. A continuous magnetic film of a chemically-ordered alloy with a tetragonal crystalline structure is irradiated with ions that have passed through a patterned non-contact mask. The ions cause disordering in the film and produce regions in the film that have no magnetocrystalline anisotropy. The regions of the film not impacted by the ions retain their chemical ordering and magnetocrystalline anisotropy and thus serve as the discrete magnetic regions that can be recorded as individual magnetic bits. The chemically-ordered alloy is preferably Co (or Fe) and Pt (or Pd) with the c-axis of the tetragonal crystalline film oriented at an angle less than 45 degrees relative to the plane of the film, so that after patterning the discrete magnetic regions can be recorded by horizontal magnetic recording.

For a fuller understanding of the nature and advantages of the present invention, reference should be made to the following detailed description taken together with the accompanying figures.

DETAILED DESCRIPTION OF THE INVENTION

Figure 1:
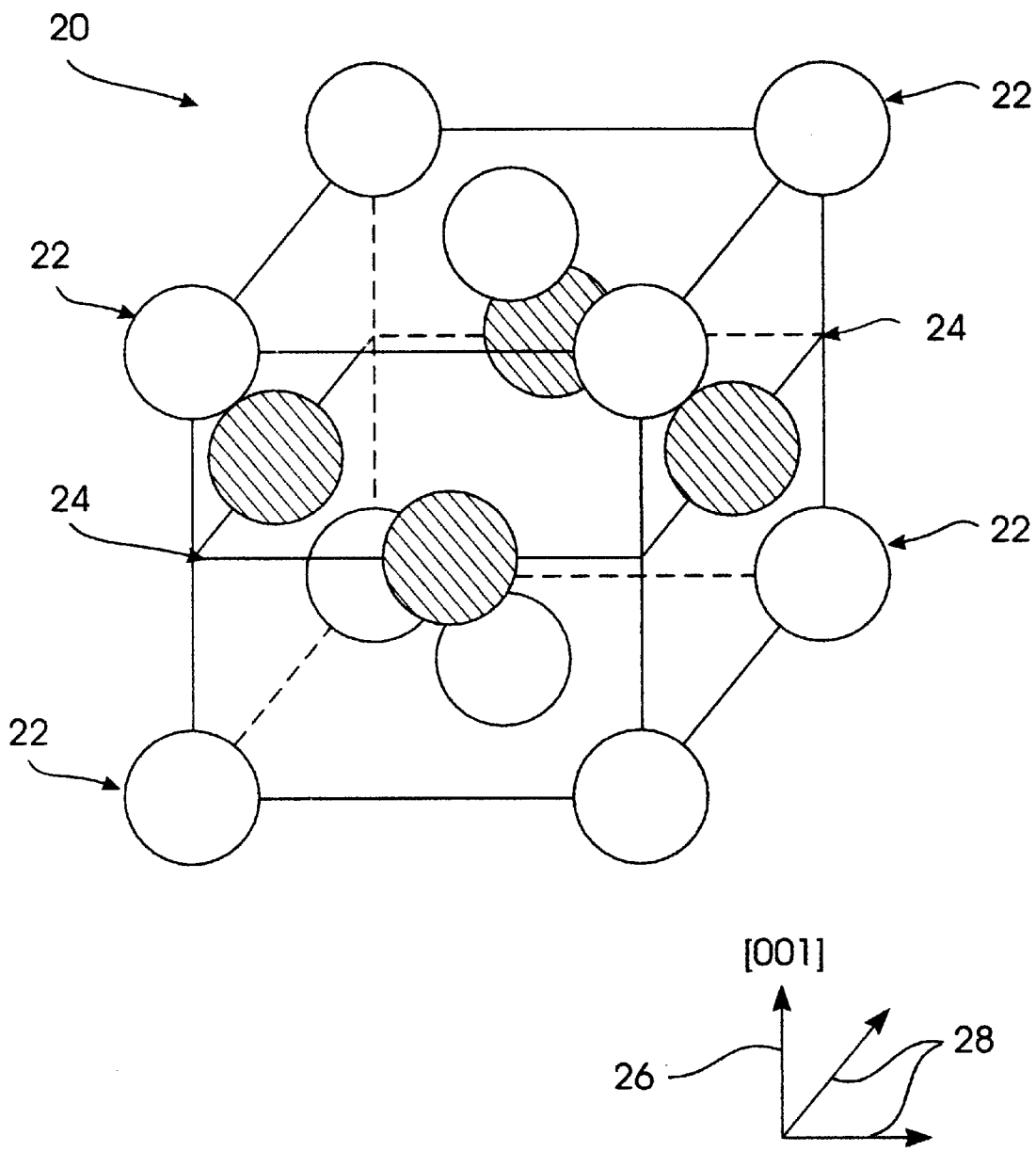
FIG. 1 is a schematic diagram of a natural intermetallic superlattice showing the orientation of the c-axis.

FIG. 1 shows the tetragonal $L1_0$ crystal structure 20 of certain natural intermetallic superlattices such as FePt and CoPt. While FePt and CoPt are the prominent examples, FePd and CoPd are also relevant to the present invention. In the face-centered-tetragonal (FCT) structure of FePt, the Fe and Pt atoms together form a structure similar to the FCC structure in which planes of Pt atoms 22 and planes of Fe atoms 24 alternate along the [001] direction. The resulting structure is termed $L1_0$ and corresponds to a superlattice in the limit that each layer is a single atomic plane thick. An axis 26 perpendicular to atomic planes 22, 24 corresponds to the c-axis of $L1_0$ structure 20, and is parallel to the [001] direction. A pair of axes 28 are parallel to atomic planes 22, 24 and correspond to the a-axes of the $L1_0$ structure 20. Thus, the $L1_0$ structure is uniaxial with the unique axis corresponding to the c-axis 26. The magnetic moments of CoPt and FePt are preferentially aligned along the c-axis.

In the present invention the process for making the patterned magnetic media begins with a continuous magnetic film of one of these chemically-ordered alloys, in which the magnetic easy axis coincides with one of the crystallographic axes. The easy magnetization axis aligns with the c-axis along the [001] direction of the tetragonally distorted cubic cell. The c-axis is distinguished from the a-axis by a different lattice constant. In the case of FePt, e.g., the "c" lattice constant is about 4% smaller than the "a" constant (c/a=0.957). In these structures planes of one atomic species, e.g., Fe, alternate with planes of the other atomic species, e.g., Pt. Because of the different sizes of these atoms a c-axis contraction occurs leading to large magnetocrystalline anisotropy. This anisotropy is sensitively dependent on the presence of the c-axis contraction or tetragonal distortion. In its absence, there is about 100 times weaker anisotropy. These tetragonal $L1_0$ crystalline FePt and CoPt films can be formed by depositing alternate layers of Fe (or Co) and Pt (or Pd) on adequate single crystalline substrates, e.g., MgO or sapphire followed by annealing. The anisotropic, chemically-ordered state forms at elevated temperatures, i.e., a film grown at room temperature is "disordered".

The preferred method for making the continuous film is as described in the previously cited co-pending application. Generally, the FePtX and CoPtX films are prepared by RF or DC magnetron sputter deposition onto nonmagnetic seed layers, preferably formed of Pt, Cr, CrV, SiN, or alloys of NiAl($B_2$), FeAl($B_2$) and CrMn, which are then etched to form a textured structure for the magnetic layer. The etching of the seed layer creates textured surface features and is preferably done by sputter etching with Argon (Ar) or other noble gases such as He, Ne, Kr, and Xe, or by using RF or DC plasma, ion beam, or laser irradiation, and reduces the thickness of the seed layer down to approximately 1–10 nm. The magnetic film is then sputter deposited onto this textured seed layer while the substrate is maintained at an elevated temperature in the range of 250–700° C. The growing magnetic film follows the structure of the seed layer in the useful thickness range (approximately 5–100 nm), and grows into columns or grains with a diameter given mainly by the size of the features on the etched or structured seed layer. Within these individual columns or grains the FePtX or CoPtX material remains chemically ordered, thus preserving the favorable properties, i.e., the high magnetocrystalline anisotropy and high magnetization, of the tetragonal crystalline material. The important macroscopic magnetic properties of the granular magnetic film, i.e., $H_c$ and $M_r t$, can be adapted to the desired need for the particular media by variation of one or more of the parameters of the FePt or CoPt material. These parameters include film thickness, substrate temperature, deposition rate, sputtering gas pressure, and film granularity. The film granularity is primarily controlled by the amount of etching of the seed layer. The predominant c-axis orientation in the film made according to this process is substantially in the plane (i.e., the c-axis forms an angle less than 45 degrees with the plane of the substrate). It is tilted out of the plane by about 36 degrees so that the main component of the magnetization, corresponding to cos (36 deg), remains in the plane of the film, thus making the film suitable for horizontal magnetic recording material.

A nonmagnetic third element X (where X=Cr, Cu, Ag, Ta, or B) can be added to the granular magnetic film. The element X is nonmagnetic and is present up to approximately 30 atomic percent. The element X does not alter the chemical ordering of the FePt or CoPt in the individual grains. It will become partly incorporated into the grains, but mainly will be accumulating at the grain boundaries. It thus acts to both "dilute" the magnetization of the granular film and to decouple the magnetic exchange between the grains in the film.

The resulting continuous granular chemically-ordered film has magnetic properties suitable for high-density, horizontal, magnetic recording media and is superior to currently used HCP CoPt alloys in terms of achievable coercivity, thermal stability, and minimum magnetically stable grain size (and thus signal/noise ratio). In this preferred method for making the continuous film, subsequent annealing is not required.

In the preferred embodiment of the continuous film used to form the patterned media, the Pt (or Pd) and Fe (or Co) are present in generally equiatomic amounts, i.e., when the atomic percentage of either the first or second element is present in a two-element film in the range of approximately 35–65 atomic percent. The existence range in compositions of intermetallic compounds (ordered intermetallic phases like FePt, CoPt etc.) is generally fairly broad, approximately +/−15%. This has to do with the weak nature of the metallic bond, as compared with the ionic bond in semiconductors where typically only very narrow "line" compounds can be formed. The weak metallic bond allows for segregation and diffusion. Thus one of the most common interpretations of the compositional spread is the local formation of disordered material. Thus, deviation from purely equiatomic 50:50 composition will result in the coexistence of ordered (magnetically hard) and disordered (magnetically soft) materials. A chemical order parameter of 70%, which means that about 30% of the sample volume exists locally in the disordered phase, is more than sufficient to generate the desired magnetic properties.

The preferred first element in the chemically-ordered film is Pt. However, palladium (Pd) may also be the first element. This is because FePd grown under similar conditions can form the same $L1_0$ structure as FePt. This material is known to have an about 10 times weaker magnetocrystalline anisotropy than FePt but it is still considerably larger than that of pure Co or the conventional HCP CoPt alloy media.

After the continuous chemically-ordered magnetic film has been formed on the substrate using the above-referenced method, or one of the prior art methods, the film is patterned to form discrete isolated magnetic regions. These discrete regions are sized to function as discrete magnetic domains or bits. This patterning can be performed without the need for selective deposition or removal of the magnetic material. Regions of the chemically-ordered FePt film are transformed from a high magnetocrystalline anisotropy (chemically ordered) state into a low anisotropy (chemically disordered) state using ion bombardment.

In the preferred patterning method, a stencil mask is irradiated with nitrogen ions (N+) at 700 keV and the ions are selectively transmitted through the mask. The ions pass through the openings in the mask and impact the FePt or CoPt film in selected regions corresponding to the pattern of holes in the mask. The ions transform the FePt or CoPt into magnetically "soft" regions corresponding to the mask pattern, with the regions of the film not impacted by the ions retaining their chemically-ordered structure. The physical mechanism of magnetic softening is believed to be chemical disordering, possibly relaxation of the strained $L1_0$ lattice phase, induced by the ions. The regions impacted by the ions are magnetically "soft" because they have substantially no magnetocrystalline anisotropy (e.g., several orders of magnitude less than the magnetocrystalline anisotropy of the magnetic regions) and do not retain magnetic remanence.

Figure 2:
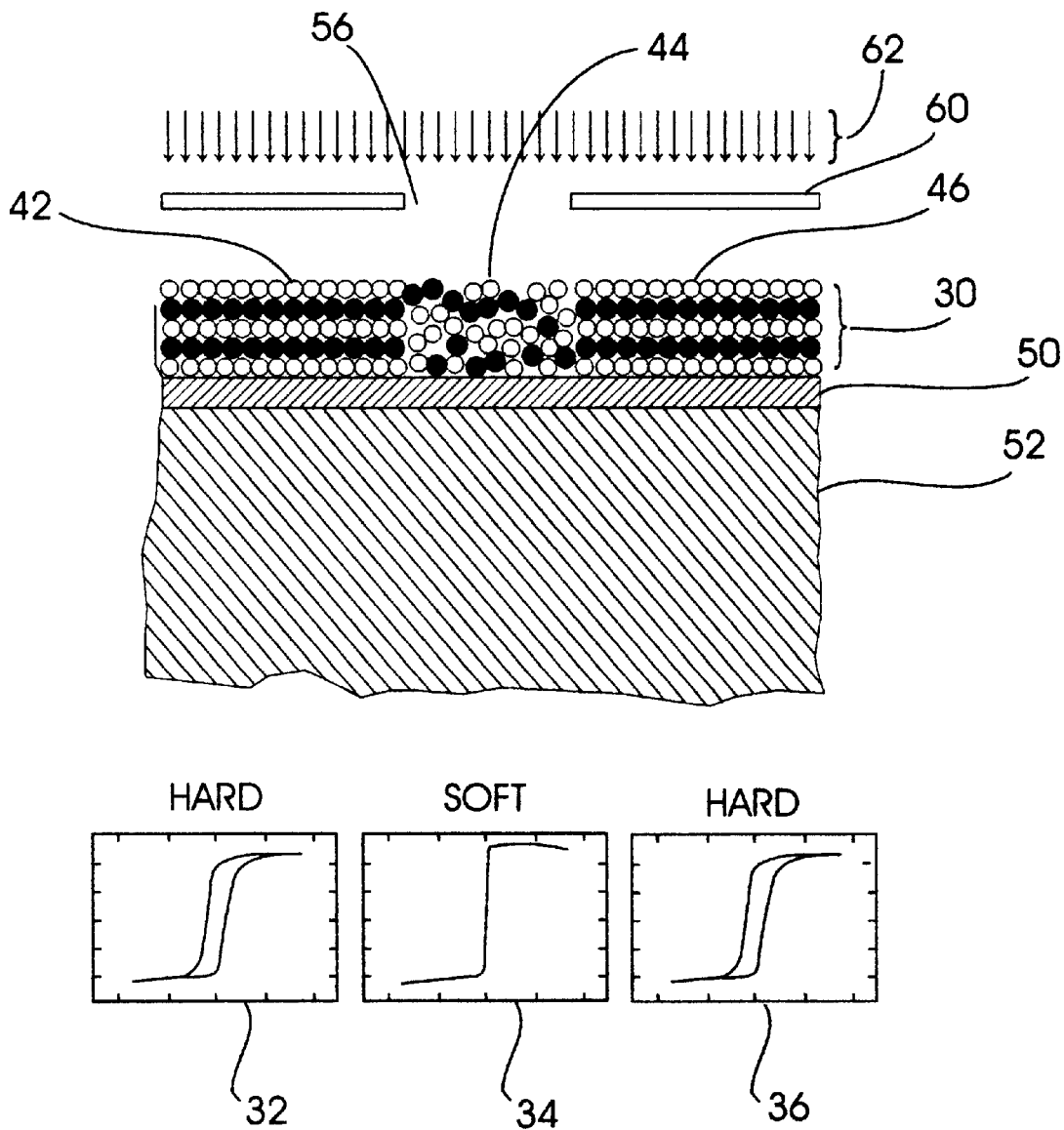
FIG. 2 is a schematic illustration of a pattern of discrete magnetically hard and soft regions formed by ion irradiation through a non-contact stencil mask, and the M-H loops corresponding to the regions.

FIG. 2 illustrates the process schematically, wherein magnetically soft 44 and hard 42, 46 regions of the film 30 are aligned with their measured M-H loops 32, 34, 36. The FePt or CoPt film 30 is formed on an etched seed layer 50 on substrate 52. The film 30 remains chemically-ordered and thus magnetically hard in the regions 42, 46 not aligned with a hole in the silicon stencil mask 60. In the region 44 of film 30 that is aligned with a hole 56 in mask 60, disordering has occurred, and region 44 is magnetically soft, as shown by the measured M-H loop 34. The in-plane coercivity, as measured from the M-H loops, alternates between 2.5 kOe (regions 42, 46) and 0 kOe (region 44).

The stencil mask 60 is a non-contact mask that comprises a wafer, such as silicon, with holes etched through it. The ions, depicted by arrows 62, are transmitted through the holes in the wafer. The silicon stencil mask was fabricated from a commercial silicon-on-insulator (SOI) wafer with a 10 μm-thick top side silicon layer, 0.5 μm of SOI oxide, and a 500 μm-thick silicon carrier substrate. The stencil holes were first patterned by optical lithography and then transferred into the 10 μm-thick Si layer by $SF_6$-based, high aspect ratio reactive ion etching (RIE) (J. K. Bhardwaj and H. Ashraf, Proc. SPIE 2639, 224 (1995)) with the SOI oxide serving as a reliable etch stop. Windows were then etched from the back side through the carrier substrate, using a similar RIE process, and the remaining SOI oxide was removed with a wet HF etch. The resulting silicon membrane is approximately 10 μm thick and covers an area of 1×1 mm. The holes in the membrane are nominally 1 μm in diameter, although somewhat irregular in shape, and are replicated throughout its area with a regular spacing of 1 to 10 μm. In making the patterned media two such stencil masks can be aligned with their holes overlapping to create holes with effective diameters in the range of 100 nm. However, it is possible to fabricate a single stencil mask in this manner, with much smaller holes in the sub-100 nm range, to produce patterned media with the desired areal density. In the preferred embodiment the mask has holes formed in a pattern to form a magnetic recording disk with concentric circular tracks, with each track having discrete magnetic regions spaced along it to serve as the individually recordable magnetic bits.

Figure 3:
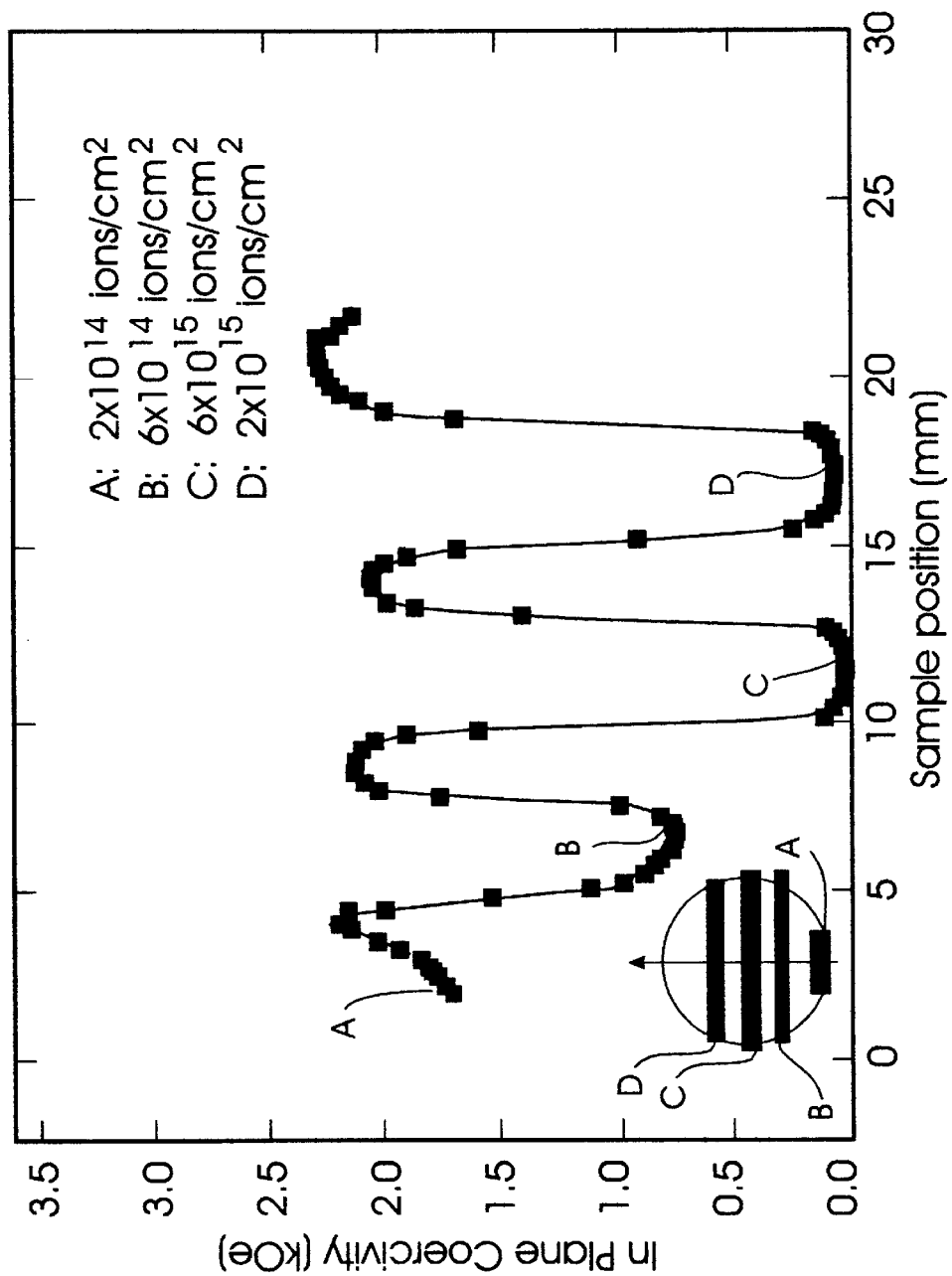
FIG. 3 is a scan with a magneto-optical Kerr looper system across a FePt sample structure that was "stripe" patterned with different doses of N+ ions.

Evidence for the chemical disordering effect caused by the ion irradiation is shown by FIG. 3. The sample in this experiment was a 100 Angstrom thick FePt chemically-ordered film with near equiatomic composition ($Fe_{55}Pt_{45}$) formed by electron beam evaporation. The sample was subjected to 700 keV nitrogen ions (N+) at doses of $2\times10^{14}$, $6\times10^{14}$, $6\times10^{15}$ and $2\times10^{15}$ ions/cm$^2$ in stripes (denoted as A, B, C and D, respectively) across the sample, as depicted by the insert in FIG. 3. The scan along a diameter perpendicular to these stripes is shown by the vertical arrow in the inset of FIG. 3. FIG. 3 shows the measured in-plane coercivity versus scan position, with the data in the graph identified as A, B, C and D corresponding to the in-plane coercivity of the stripe regions A, B, C and D, respectively. Each data point was obtained from a Kerr hysteresis loop measurement. The stripes are approximately 2 mm wide. This is sufficient to avoid interference with the approximately 1 mm diameter laser beam of the Kerr system. The data of FIG. 3 shows that the chemically-ordered phases can be transformed from the chemically ordered state to the disordered state with relatively low ion doses. This presents a distinct practical advantage, requiring brief irradiation time, and causing less damage to the patterning mask.

Figure 4:
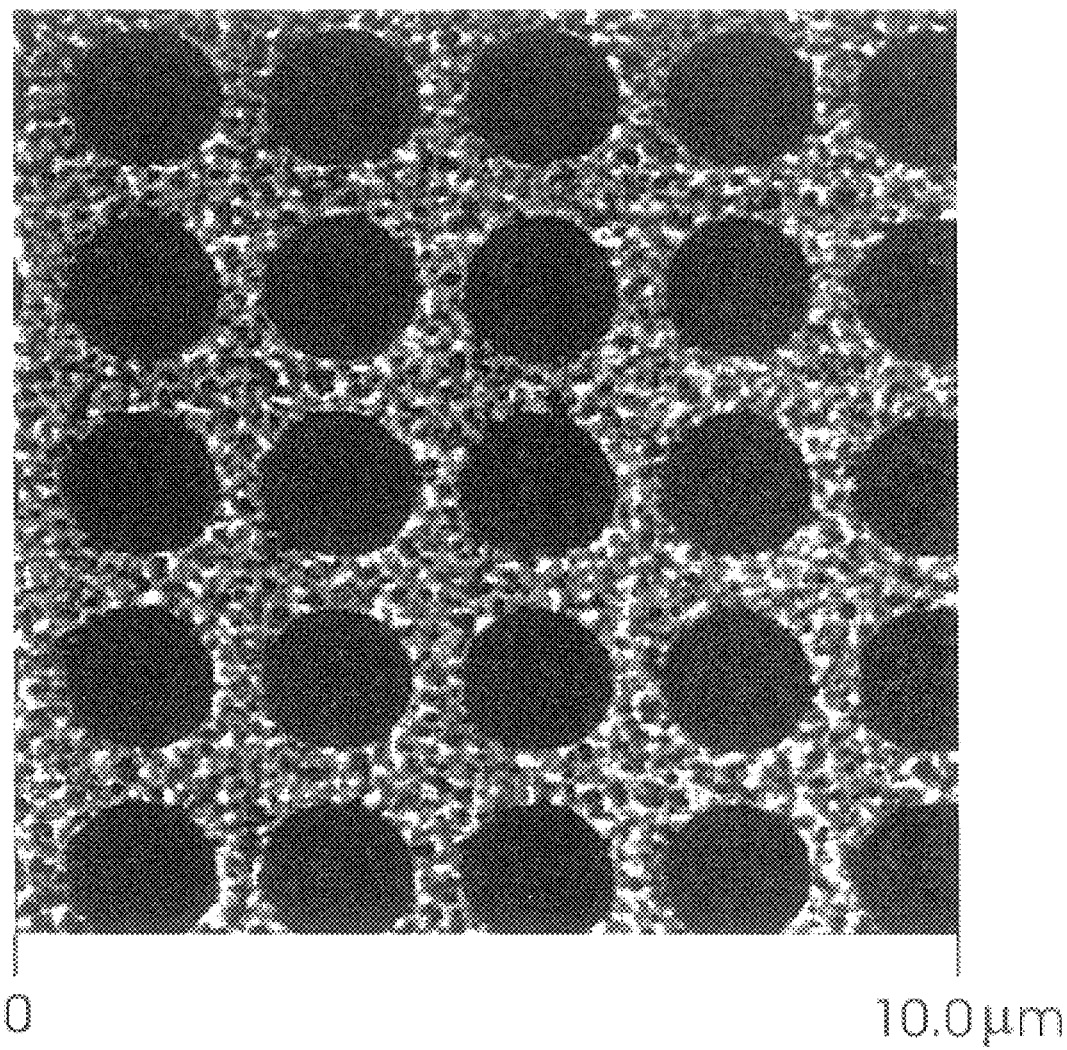
FIG. 4 is a magnetic force microscopy (MFM) image obtained from a 10 nm thick chemically-ordered FePt alloy film irradiated through a stencil mask with 700 keV N+ ions at a dose of $2 \times 10^{16}$ ions/cm$^2$.

FIG. 4 shows a magnetic force microscopy (MFM) image of an area of an FePt film which has been exposed to N+ ions at a dose of $2\times10^{10}$ ions/cm$^2$ at 700 keV through a mask. The holes in the mask are approximately 1 μm in diameter. As shown by the MFM image, the ions through each hole have generated circular regions where disordering has occurred and these regions are thus magnetically soft. As a result, the regions between the circular regions are magnetically hard and can function as discrete magnetically recordable bits.

The preferred embodiment of the present invention is a horizontal magnetic recording disk wherein the continuous chemically-ordered FePt or CoPt magnetic film that is subsequently patterned has its c-axis oriented substantially in the plane, as described in the previously-cited pending application. However, the chemically-ordered FePt or CoPt film may also have its c-axis oriented perpendicular to the substrate, as is known in the art, in which case after patterning the disk will have discrete magnetic regions usable for perpendicular magnetic recording.

While nitrogen ions were used, other ion species that may be used include ions of He, Ar, Ne, Kr and Xe. The voltage and dosage of the ion irradiation required to achieve the desired chemical disordering can be determined from experimental measurements, such as shown by FIG. 4.

The preferred method for patterning the media with ion irradiation is by a non-contact mask, such as the silicon stencil mask described above. However, it is also possible to use conventional lithography, where a photoresist is formed on the continuous magnetic film and patterned to expose openings aligned with portions of the film intended to become the regions that separate or isolate the magnetic regions from one another.

After the film has been patterned, a conventional protective overcoat, such as an amorphous carbon overcoat, can be formed over it to complete the fabrication of the patterned magnetic disk.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

What is claimed is:

1. A magnetic recording medium comprising:

a substrate;

a continuous metal alloy film formed on the substrate and patterned into discrete magnetic regions isolated from one another by regions of the film having substantially no magnetocrystalline anisotropy, the magnetic regions of the film and the substantially no magnetocrystalline anisotropy regions being formed of a material comprising a first element selected from the group consisting of Pt and Pd and a second element selected from the group consisting of Co and Fe, and the magnetic regions of the film comprising a chemically-ordered alloy of said first element and said second element having a chemical order parameter greater than or equal to 70% and a substantially $L1_0$ tetragonal crystalline structure.

2. The medium of claim 1 wherein the c-axis of the crystalline alloy in the magnetic regions is oriented substantially perpendicular to the substrate.

3. The medium of claim 1 wherein the c-axis of the crystalline alloy in the magnetic regions is oriented at an angle less than 45 degrees relative to the plane of the substrate.

4. The medium of claim 1 wherein the first element is present in the film in the compositional range of approximately 35 to 65 atomic percent.

5. The medium of claim 1 wherein the film further comprises a third element selected from the group consisting of Cr, Ag, Cu, Ta, and B.

6. The medium of claim 1 further comprising an etched seed layer of nonmagnetic material formed on the substrate, wherein the film is formed directly on the etched seed layer, and wherein the film is a granular film with the easy axis of magnetization in the magnetic regions of the film forming an angle less than 45 degrees with the substrate.

7. The medium of claim 6 wherein the nonmagnetic seed layer is selected from the group consisting of Pt, Pd, Cr, CrV, SiN, NiAl($B_2$) alloy, FeAl($B_2$) alloy, and CrMn alloy.

8. A patterned magnetic recording disk for horizontal magnetic recording comprising:

a disk substrate;

a continuous metal alloy film formed on the substrate and patterned into discrete magnetic regions isolated from one another by regions having substantially no magnetocrystalline anisotropy, the magnetic regions and the substantially no magnetocrystalline anisotropy regions being formed of a material comprising a first element selected from the group consisting of Pt and Pd and a second element selected from the group consisting of Co and Fe, the magnetic regions of the film comprising a chemically-ordered alloy of said first element and said second element having a chemical order parameter greater than or equal to 70% and a substantially $L1_0$ tetragonal crystalline structure with the easy axis of magnetization forming an angle less than 45 degrees with the substrate.

9. The disk of claim 8 wherein the first element is present in the film in the compositional range of approximately 35 to 65 atomic percent.

10. The disk of claim 8 wherein the film further comprises a third element selected from the group consisting of Cr, Ag, Cu, Ta, and B.

11. The disk of claim 8 further comprising an etched seed layer of nonmagnetic material formed on the substrate, wherein the film is formed directly on the etched seed layer, and wherein the film is a granular film.

12. The disk of claim 11 wherein the nonmagnetic seed layer is selected from the group consisting of Pt, Pd, Cr, CrV, SiN, NiAl($B_2$) alloy, FeAl($B_2$) alloy, and CrMn alloy.

* * * * *

UNITED STATES PATENT AND TRADEMARK OFFICE
CERTIFICATE OF CORRECTION

PATENT NO.    : 6,331,364 B1                                    Page 1 of 1
DATED         : December 18, 2001
INVENTOR(S)   : John Edward Eric Baglin et al.

It is certified that error appears in the above-identified patent and that said Letters Patent is hereby corrected as shown below:

<u>Title page,</u>
Item [54], the third line of the Title, delete the word "OF" and replace with the word -- OR --.
Item [73], the fourth line of "Assignees", delete the word "FOUNDATIONS" and replace with the word -- FOUNDATION --.

Signed and Sealed this

Thirteenth Day of August, 2002

*Attest:*

*Attesting Officer*

JAMES E. ROGAN
*Director of the United States Patent and Trademark Office*